(12) United States Patent
Reid

(10) Patent No.: US 8,341,074 B1
(45) Date of Patent: Dec. 25, 2012

(54) METHOD AND SYSTEM FOR REDUCING THE TOTAL INTEREST PAID ON A DEBT

(76) Inventor: Robert A. Reid, Schenectady, NY (US)

( * ) Notice: Subject to any disclaimer, the term of this patent is extended or adjusted under 35 U.S.C. 154(b) by 0 days.

(21) Appl. No.: 13/198,090

(22) Filed: Aug. 4, 2011

(51) Int. Cl.
*G06Q 40/00* (2006.01)

(52) U.S. Cl. ............................................ 705/38; 705/30

(58) Field of Classification Search ............... 705/10–44
See application file for complete search history.

(56) References Cited

U.S. PATENT DOCUMENTS

| | | | |
|---|---|---|---|
| 6,173,272 B1 * | 1/2001 | Thomas et al. ................. | 705/42 |
| 6,304,860 B1 * | 10/2001 | Martin et al. ................... | 705/43 |
| 6,938,008 B1 | 8/2005 | Stokes | |
| 7,627,509 B2 | 12/2009 | George | |
| 7,844,519 B2 * | 11/2010 | Wehunt et al. ................. | 705/35 |
| 8,055,564 B2 * | 11/2011 | Wehunt et al. ................. | 705/35 |
| 8,160,959 B2 * | 4/2012 | Rackley et al. ................. | 705/39 |
| 2002/0111901 A1 * | 8/2002 | Whitney ......................... | 705/38 |
| 2004/0015438 A1 * | 1/2004 | Compiano et al. ............. | 705/40 |
| 2004/0143529 A1 * | 7/2004 | Frattalone ...................... | 705/35 |
| 2006/0178987 A1 * | 8/2006 | Ostergren ...................... | 705/40 |
| 2010/0094776 A1 | 4/2010 | Combs | |
| 2010/0185467 A1 * | 7/2010 | Strnad, II ....................... | 705/4 |

* cited by examiner

*Primary Examiner* — Frantzy Poinvil
(74) *Attorney, Agent, or Firm* — Maxine L. Barasch; Keohane & D'Alessandro, PLLC

(57) ABSTRACT

A loan repayment system and method comprises a loan account for a purchased item, and a personal fund account used to manage discretionary money. A user deposits discretionary money periodically into the fund account. Typically, the fund account has a starting balance of at least one full cycle's worth of such deposits. Additional principal payments, leveraged from the fund account to front-load against the loan account, are used to exponentially counter the total interest. As the method recycles with each full cycle, the loan account balance is reduced faster.

17 Claims, 8 Drawing Sheets

| Date | Starting | Payment | Input | Ending |
|---|---|---|---|---|
| Jan-11 | $15,000.00 | $7,533.79 | $1,000.00 | $8,466.21 |
| Feb-11 | $8,466.21 | $2,771.53 | $1,000.00 | $6,694.68 |
| Mar-11 | $6,694.68 | $1,019.59 | $1,000.00 | $6,675.09 |
| Apr-11 | $6,675.09 | $375.09 | $1,000.00 | $7,300.00 |
| May-11 | $7,300.00 | $0.00 | $1,000.00 | $8,300.00 |
| Jun-11 | $8,300.00 | $0.00 | $1,000.00 | $9,300.00 |
| Jul-11 | $9,300.00 | $0.00 | $1,000.00 | $10,300.00 |
| Aug-11 | $10,300.00 | $0.00 | $1,000.00 | $11,300.00 |
| Sep-11 | $11,300.00 | $0.00 | $1,000.00 | $12,300.00 |
| Oct-11 | $12,300.00 | $0.00 | $1,000.00 | $13,300.00 |
| Nov-11 | $13,300.00 | $0.00 | $1,000.00 | $14,300.00 |
| Dec-11 | $14,300.00 | $0.00 | $1,000.00 | $15,300.00 |
| Jan-12 | $15,300.00 | $7,533.79 | $1,000.00 | $8,766.21 |
| Feb-12 | $8,766.21 | $2,771.53 | $1,000.00 | $6,994.68 |
| Mar-12 | $6,994.68 | $1,019.59 | $1,000.00 | $6,975.09 |
| Apr-12 | $6,975.09 | $375.09 | $1,000.00 | $7,600.00 |
| May-12 | $7,600.00 | $0.00 | $1,000.00 | $8,600.00 |
| Jun-12 | $8,600.00 | $0.00 | $1,000.00 | $9,600.00 |
| Jul-12 | $9,600.00 | $0.00 | $1,000.00 | $10,600.00 |
| Aug-12 | $10,600.00 | $0.00 | $1,000.00 | $11,600.00 |
| Sep-12 | $11,600.00 | $0.00 | $1,000.00 | $12,600.00 |
| Oct-12 | $12,600.00 | $0.00 | $1,000.00 | $13,600.00 |
| Nov-12 | $13,600.00 | $0.00 | $1,000.00 | $14,600.00 |
| Dec-12 | $14,600.00 | $0.00 | $1,000.00 | $15,600.00 |

FIG. 5

METHOD AND SYSTEM FOR REDUCING THE TOTAL INTEREST PAID ON A DEBT

FIELD OF THE INVENTION

The present invention relates generally to financial systems, and more specifically to a system and method for accelerated loan repayment.

BACKGROUND

Various types of payment plans for paying off a loan, such as a home mortgage or auto loan are known. When considering the interest on the loan, the total cost of the item purchased with the loan can be far higher than the sales price. In fact, the hidden cost of interest is one of the main reasons for long-term financial debt. Although most consumers may not know the type of interest attached to their loans, and how fixed minimum payments mask the disproportionate interest payments, they do know that longer terms mean lower minimum monthly payments. Unfortunately, relying on the current publicized repayment methods (sorting by balance or interest rate and paying extra money monthly towards either of them) does not maximize the interest-debt reduction capabilities. It is therefore desirable to have an improved system and method for reducing both the debt and the total interest paid.

SUMMARY

Embodiments of the present invention provide an improved payment schedule for one or more debts, such as a loan for a home, car and/or college, by leveraging discretionary money from a fund account, which has funds separate from funds used for other expenses.

A user deposits discretionary money periodically into the fund account. Typically, the fund account has a starting balance of at least one full cycle's worth of such deposits. Additional principal payments, leveraged from the fund account, front-load against the outstanding principal balance of the loan account and counter the total interest paid. As the method recycles with each full cycle, the loan account balance is reduced faster.

In one embodiment, a method is provided for generating a principal payment schedule for a loan, comprising:
establishing an additional principal payment fund account;
establishing a starting balance for the additional principal payment fund account;
calculating a periodic deposit schedule for the additional principal payment fund account;
establishing a front-loaded principal payment schedule for a first predetermined period; and
establishing a recovery cycle for a second predetermined period.

In another embodiment, a system is provided for generating an additional principal payment schedule for a loan, comprising a computer, said computer comprising a processor and non-transitory storage, wherein the non-transitory storage stores machine instructions, that when executed by the processor,
compute a front-loaded additional principal payment schedule for a first predetermined period; and
establish a second predetermined period, wherein additional principal payments are suspended during the second predetermined period.

In another embodiment, a system is provided for generating an additional principal payment schedule for a loan, comprising a computer, said computer comprising:
a processor;
non-transitory storage; and
a communications interface connected to a communications network;
wherein the non-transitory storage stores machine instructions, that when executed by the processor:
compute a front-loaded additional principal payment schedule for a first predetermined period; establish a second predetermined period, wherein additional principal payments are suspended during the second predetermined period; and
communicate with a lending system via the communications interface to schedule an additional principal payment during the first predetermined period at a time specified by the front-loaded additional principal payment schedule.

BRIEF DESCRIPTION OF THE DRAWINGS

FIG. 5 is an example of an additional principal payment schedule generated by an embodiment of the present invention.

DETAILED DESCRIPTION

Figure 1:
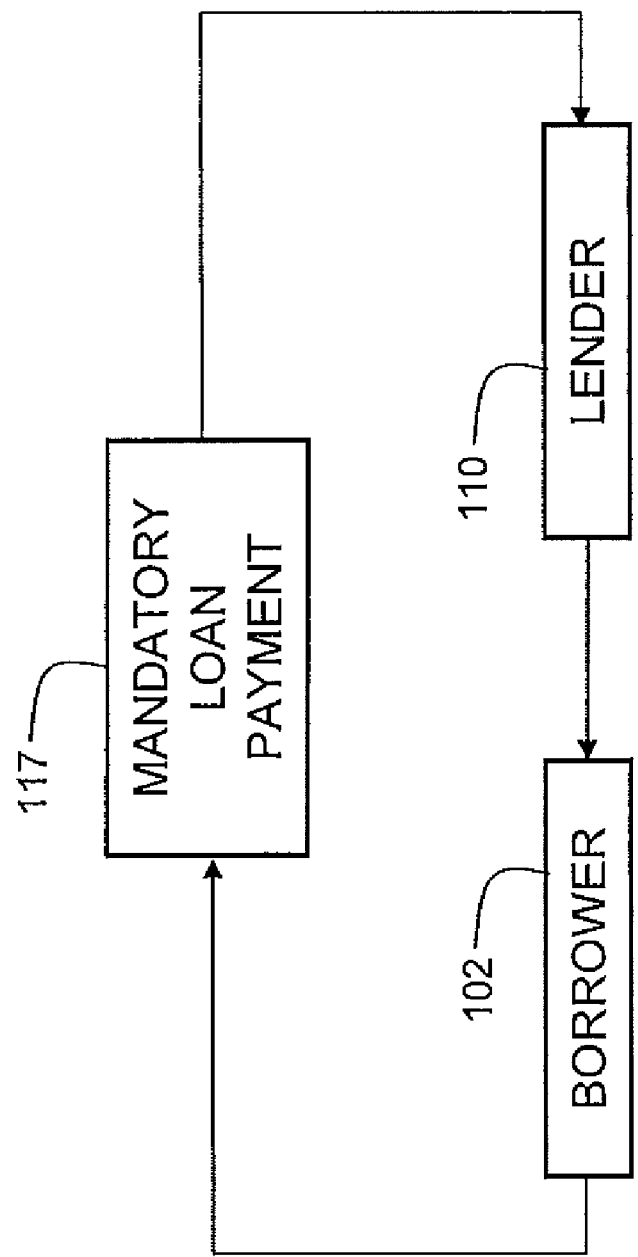
FIG. 1 shows a block diagram of a prior art lending arrangement.

FIG. 1 shows a block diagram of a prior art lending arrangement which will be briefly described here to provide context for describing embodiments of the present invention. A lender 110 lends a lump sum to a borrower 102. Periodically, the borrower 102 makes a mandatory loan payment 117 back to the lender. While the mandatory loan payment 117 may be a fixed amount, the portions of the payment going towards principal and interest differ with each payment.

For example, borrowing $100,000 over 30 years, at a fixed interest rate of 6%, results in a mandatory loan payment of approximately $600 per month. In the first month, only about $100 goes towards principal, and the remaining $500 goes towards interest. By the tenth year of the loan, approximately $180 of the $600 payment goes towards principal, and about $420 of the $600 payment goes towards interest. If the loan is paid off using only the mandatory loan payment 117, the total amount paid over the life of the loan exceeds $215,000, (i.e. $115,000 as interest paid.) In this example, buying something with "borrowed" money more than doubled the price the borrower ultimately paid. Hence, it is desirable to reduce the interest paid, (and the total amount paid) over the life of the loan.

Figure 2:
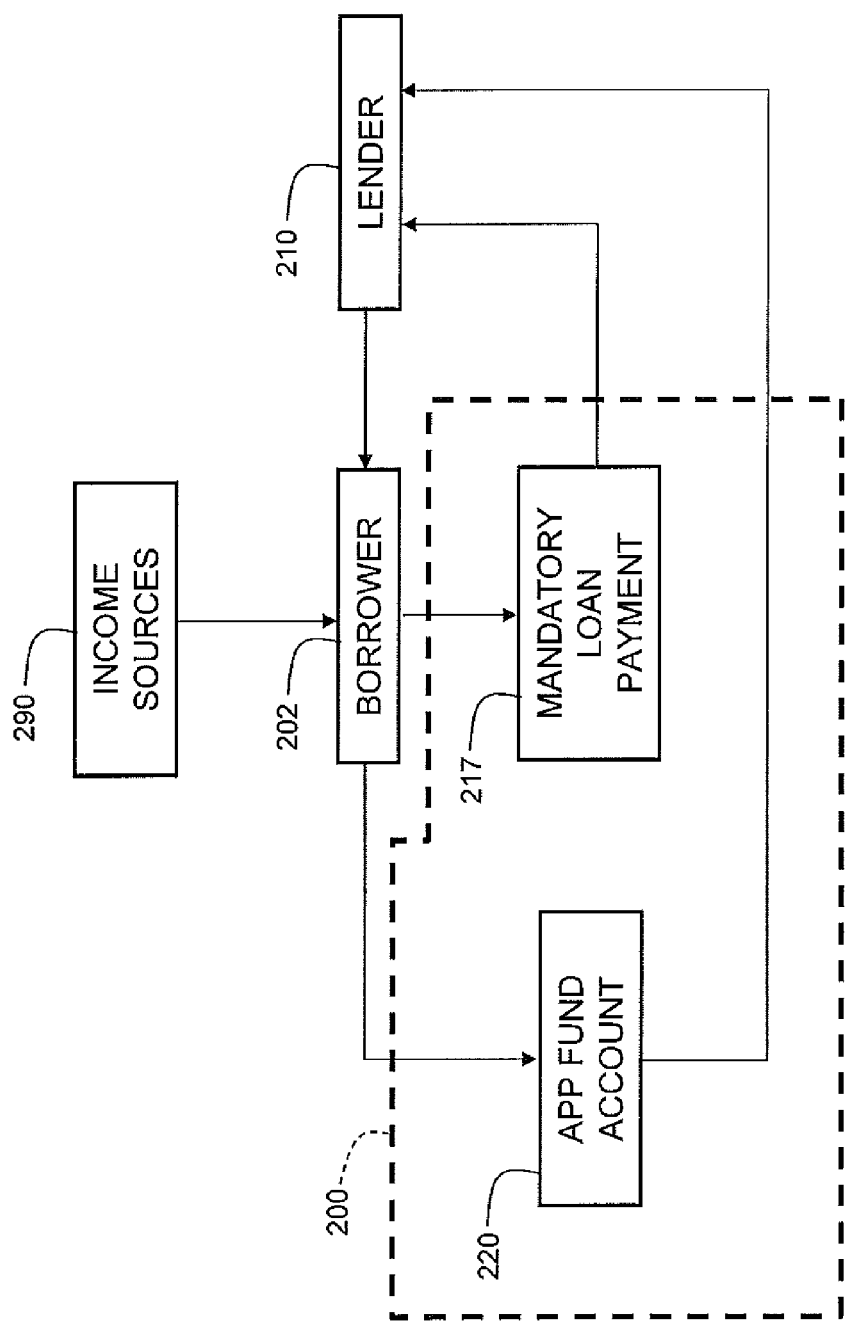
FIG. 2 shows a block diagram of an embodiment of the present invention.

FIG. 2 shows a block diagram of an embodiment of the present invention 200. Embodiments of the present invention employ a secondary account to manage incoming funds and additional principal payments. Similar to as described for FIG. 1, a lender 210 makes a lump sum loan to a borrower 202, and the borrower makes the mandatory periodic loan payment 217.

In order to accelerate repayment of the loan, hence reducing the total interest paid, additional principal payments are applied to the loan. However, instead of simply paying an arbitrary extra amount for principal on a periodic basis (e.g. monthly), embodiments of the present invention provide a strategic front-loaded and short-cycled schedule for additional principal payments, which pays the loan off faster than periodic payments of equal amounts.

Income sources 290 are received by the borrower. These may include wages, rents, royalties, investment returns, or any other income source. The borrower 202 establishes a dedicated additional principal payment (APP) fund account 220. The APP fund account 220 is seeded with an initial amount prior to starting the accelerated payment system in accordance with an embodiment of the present invention.

The borrower calculates a periodic deposit schedule for replenishing the APP fund account 220. Additional principal payments are provided to the lender 210 from the APP fund account 220. Since the interest paid to the lender is asymmetric, the additional principal payments are also asymmetric to proactively counter and quickly reduce the loan balance, and hence the interest paid.

EXAMPLE 1

For example, in one embodiment, the borrower 202 establishes an APP fund account 220 with a starting balance of $15,000. The borrower supplies $1,000 per month to the fund account 220. For the first four months of the full cycle (a year in this example), the borrower makes additional principal payments to the lender 210 from the APP fund account 220. Note that the sum of additional principal payments over full cycle will not exceed the sum of cycle deposits. These additional principal payments over a few months are separate from the mandatory payments—and are applied in advance to further reduce interest paid, and outstanding balance for each applicable month. Then, for a number of months, the APP fund account enters a recovery cycle. While the mandatory payments are still being made, the additional principal payments are suspended, but the borrower continues to make the periodic deposits to the APP fund account 220 to replenish it. The result is that in a given year, applying the same amount of additional principal payments as front-loaded payments results in additional reduction of the loan balance as compared with the steady periodic payment schedule. The duration of the additional principal payments from the APP fund account is referred to as a load cycle. The duration where no additional principal payments are being made is referred to as a recovery cycle. The combined duration of the load cycle and the recovery cycle is referred to as a full cycle. Note that while this example illustrates the full cycle as one year, other durations for the predetermined periods of the load cycle and recovery cycle are possible. For example, a load cycle of 5 months and recovery cycle of 9 months are possible, in which case the full cycle is 14 months (instead of one year). With a front-loaded payment schedule, the first additional principal payment in a load cycle is the highest and subsequent additional principal payments within that cycle are less and less with each subsequent payment period.

Figure 3:
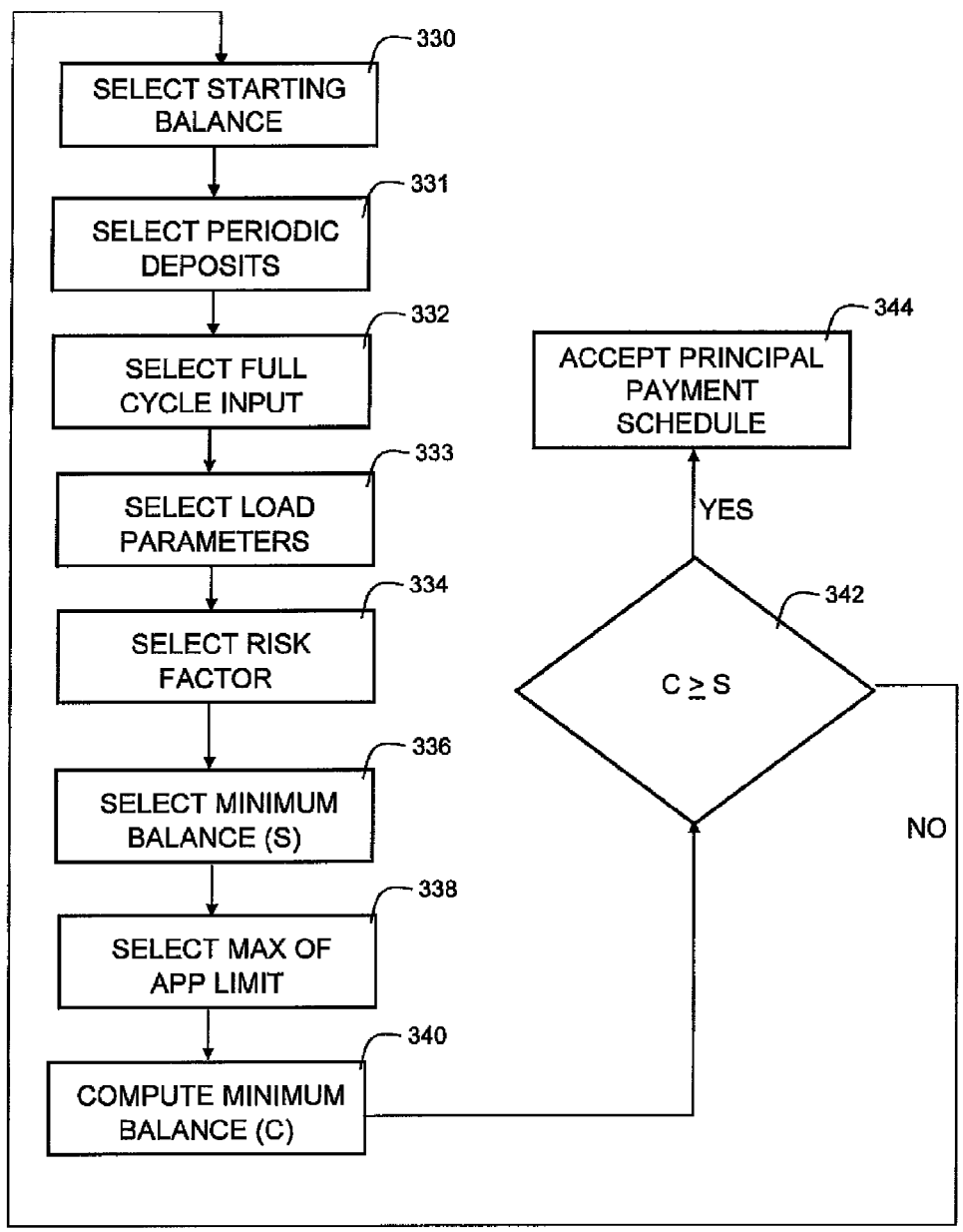
FIG. 3 is a flowchart indicating process steps for an embodiment of the present invention.

FIG. 3 is a flowchart indicating process steps for an embodiment of the present invention. In process step 330, a starting balance for the APP fund account is selected. In example 1, this amount is $15,000. Preferably, the starting balance of the APP fund account is greater than or equal to the amount input for each full cycle. In process step 331, the periodic deposit rate is selected to replenish the fund account through each full cycle. In process step 332, a full cycle input amount is selected. In process step 333, the load parameters (load periods, recovery periods, curve and constants) are selected to counter interest paid. Note also that the formula of the curve to determine additional principal payments does not have to be exponential.

In example 1, the full cycle input amount is $12,000 per year, i.e. monthly deposits of $1,000 are made to the APP fund account. Optionally, in process step 334 a risk factor is selected. The risk factor is a value ranging from 0 to 1, but more preferably, a value in the range of 0.75 to 1 is used to allow a borrower to apply a fraction of the annual input to the additional principal. For example, with an annual input amount of $12,000 and a risk factor of 0.975, then only $11,700 is applied to principal during the full cycle. Therefore:

$$F = K \times R$$

Where:
F is the full cycle reduced amount;
K is the full cycle input amount supplied to the APP fund account; and
R is the risk factor, ranging from 0 to 1.

The periodic deposit rate to replenish the APP fund account is determined by dividing the full cycle input amount by the number of periods per full cycle. Therefore:

$$D = K/N$$

Where D is the periodic deposit rate;
K is the full cycle input amount supplied to the APP fund account; and
N is the number of replenishment periods per full cycle.

For example, if a full cycle is one year with a replenishment period of one month, and the full cycle input amount, K=$12,000, then D=K/N=12,000/12=$1,000 per month, which is a periodic deposit rate for the APP fund account.

When the risk factor is less than 1, the amount of money periodically entering the APP fund account is greater than the amount exiting the APP fund account for additional principal payments, which builds a surplus (on what was the starting balance) and can be used for unexpected expenses that may occasionally arise.

In process step 336, a desired minimum balance for the APP fund account over a given time span (e.g. 2 years) is selected. In this way, the payment schedule is such that the balance in the APP fund account will be greater than or equal to the minimum level for the duration of the given time span, supporting the borrower's interest-debt reduction comfort/tolerance level and serving as a reserve fund in the event of an unexpected financial issue. In process step 338, the maximum value of the additional principal payments is selected. This is also based on borrower's interest-debt reduction comfort/tolerance level. In process step 340, the minimum balance over that time span (e.g. 2 years) is computed. In process step 342, the computed minimum balance of step 340 is compared with the selected minimum balance of step 336. If the computed minimum balance (C) is greater than or equal to the selected minimum balance (S), then the payment schedule is accepted in process step 344. If the computed minimum balance (C) is less than the selected minimum balance (S), then the process returns to step 330, and new parameters are selected to achieve the minimum balance goals. In one embodiment of the present invention, various parameters, such as the risk factor, may be automatically adjusted to accommodate the selected minimum balance originally chosen in process step 336, which results in a revised periodic deposit schedule—or a less aggressive interest-debt reduction operation plan. In another embodiment, the borrower is prompted to re-enter some or all of the parameters, giving the borrower an opportunity to change various things such as the annual input, starting balance, and desired minimum balance in order to derive a payment schedule that is suitable for his/her personal financial situation.

Generally, as it applies to the embodiment of the present invention, the interest-debt reduction capability increases significantly by the following:

increasing starting balance (330),
increasing periodic deposit rate (331),
reducing load & recovery periods (333),
adjusting curve and constants of additional principal payments (333),
increasing risk factor (334),
lowering minimum balance (336),
increasing maximum of additional principal payments (338),
prioritizing additional principal payments before mandatory payments (344)

Although these factors above may be changed to maximize the capability of the interest-debt reduction process (i.e. operation plan) significantly, some of these factors actually constrain the capability. Thus, based on the user's personal financial situation, the final customized plan (a comfortable payment schedule selected by the user) will fall within the more aggressive 'capability limit' (maximum payment schedule allowed by the system) of the interest-debt reduction operation plan by embodiments of the present invention, before the user can proceed.

Figure 4:
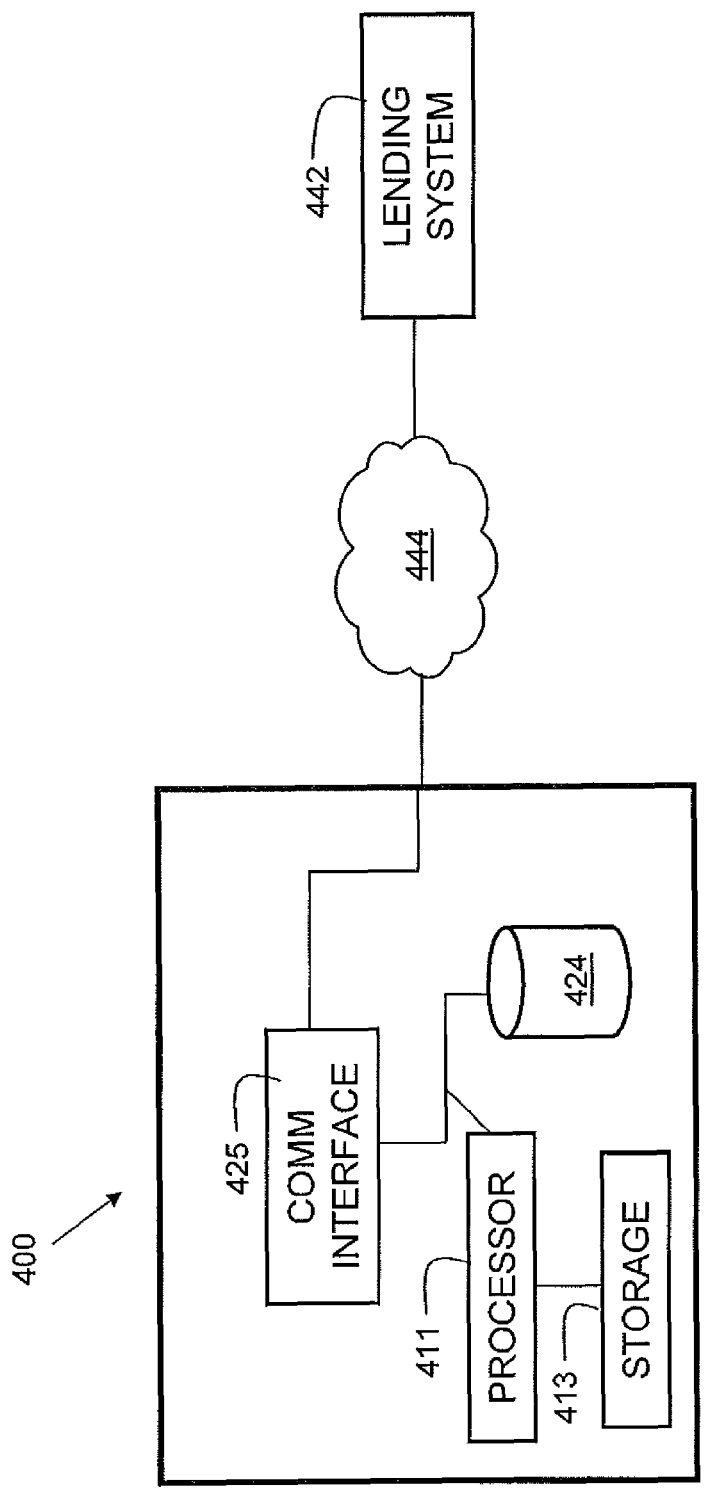
FIG. 4 is a block diagram of a system for an embodiment of the present invention.

FIG. 4 is a block diagram of a system 400 for an embodiment of the present invention. System 400 is a computer comprising a processor 411 which interfaces with non-transitory storage 413. Additionally, a mass storage device 424 (such as a hard disk) may be used, along with non-transitory storage 413, to store machine instructions, that when executed by processor 411, generate principal payment schedules in accordance with embodiments of the present invention. Optionally, system 400 may comprise communication interface 425, which is configured to communicate with communications network 444. In one embodiment, communications network 444 may be the Internet. In one embodiment, system 400 may communicate with lending system 442 to automatically issue or schedule a principal payment towards the loan. The term "lending," "lending institution" or "lending system" herein encompasses any type of lending institution, for example, without limitation, bank, credit union, saving and loan association, brokerage firm, and mutual fund company. In another embodiment, system 400 automatically suspends or cancels the additional principal payments if the balance in the APP fund account falls below the minimum balance specified. This may occur if the user withdraws funds from the APP fund account for another purpose (e.g. an emergency). When the user is able to replenish the APP fund account to a level above the minimum selected balance, the borrower can restart with a renewed full cycle or automatically resume.

FIG. 5 is an example of a fund account payment schedule 500 generated by an embodiment of the present invention. Column 502 represents the date, covering a two-year period starting with January 2011 through December 2012. Column 504 represents a starting balance for the month. The initial starting balance is $15,000. Column 506 represents additional principal payments. These payments are in addition to the mandatory monthly payment required by the lender. Column 508 represents a periodic input to the APP fund account. In this case, the borrower is putting $1,000 per month into the APP fund account. Column 510 represents the ending balance after considering the input 508 and payments 506. By ignoring the negligible interest earned on the fund account balance, the ending balance is computed by:

$$E=S-P+I$$

Where E is the ending balance (column 510);
S is the starting balance (column 504);
P is the payment amount (column 506); and
I is the input amount (column 508).
Table 500 also uses the following input parameters.
L=4, where L is the Load Cycle, representing the number of periods per year where additional principal is paid.
K=12,000, and is the full cycle input amount supplied to the APP fund account.
R=0.975, and is the risk factor, ranging from 0 to 1.
F=K×R=$12,000×0.975=$11,700, and is the full cycle reduced amount.

From table 500, it can be seen that there are 4 months where additional principal payments are paid, from January 2011, to April 2011 (since L=4). Then from May 2011 to December 2011, no additional principal payments are made, and the APP fund account enters a recovery cycle, where it is getting replenished by the input amount (column 508) each month.

It can furthermore be seen that the payments are asymmetric. The January 2011 payment is much larger than the April 2011 payment. Summing the payments from January 2011 to April 2011 involves summing the four numbers below:

$7,533.79
$2,771.53
$1,019.59
$375.09

This results in a total payment amount for the year of the $11,700 that was requested.

By starting with a larger payment first, and then going to subsequently smaller and smaller payments, the balance owed on the loan is reduced quicker than if that amount had been spread over the year in constant monthly payments—even though in both cases, the same amount is paid towards the loan annually.

The formula for computing the payment schedule is as follows:

$$Y(m)=F\exp(-A(m)+B)$$

Where Y is an additional payment for period number m;
F is the full cycle reduced amount;
m is the payment period (e.g. a month); and
A and B are values ranging from 0 to 1.
When A=1, the following B values correspond to a given L (Load Cycle).

| Load Cycle | B |
| --- | --- |
| 4 | 0.559809 |
| 5 | 0.548085 |
| 6 | 0.543806 |

By adjusting the B constant, a variety of Load Cycles can be achieved.

For example, with A=1, B=0.559809, paying $11,700 over four months yields the following formula:

$$Y(m)=\$11,700\times\exp(-1*m+0.559809)$$

This results in the following payment schedule:

| | |
| --- | --- |
| Payment for period number 1 | $7,533.79 |
| Payment for period number 2 | $2,771.53 |
| Payment for period number 3 | $1,019.59 |
| Payment for period number 4 | $375.09 |

EXAMPLE 2

In another example, with A=1, B=0.548085, paying $11,700 over five months (L=5) yields the following formula:

$$Y(m) = \$11,700 \exp(-1 * m + 0.548085)$$

This results in the following payment schedule:

| | |
|---|---|
| Payment for period number 1 | $7,445.98 |
| Payment for period number 2 | $2,739.22 |
| Payment for period number 3 | $1,007.70 |
| Payment for period number 4 | $370.71 |
| Payment for period number 5 | $136.38 |

The exponential equation counters the front-loaded interest paid in the mandatory payments by front-loading the principal paid with the additional principal payments. The full cycle reduced amount is multiplied by an exponential factor comprising coefficient A and constant B. The coefficient A, and constant B adjust the principal payments into the user's comfort level. For example, one person may want the first large payment less than $7,600, which is satisfied in the above case where L=4, and another may desire a first large payment that is less than $7,500, which is satisfied in the case where L=5 (first payment is $7,445.98, which is less than $7,500).

EXAMPLE 3

In another embodiment, a lookup table with values is stored in non-transitory storage (413, FIG. 4), and is used to generate the payment schedule:

| | |
|---|---|
| Period number 1 | 0.65 |
| Period number 2 | 0.23 |
| Period number 3 | 0.08 |
| Period number 4 | 0.04 |

In this case, the first payment is 0.65×F, where F is the full cycle reduced amount. The second payment amount is 0.23×F, and so on. Hence, for a case where F=$10,000, the payment schedule for the additional principal payments is:

| | |
|---|---|
| Payment for period number 1 | $6,500.00 |
| Payment for period number 2 | $2,300.00 |
| Payment for period number 3 | $800.00 |
| Payment for period number 4 | $400.00 |

The values in the lookup table vary inversely to the payment period number. For example, in the lookup table for example 3, period number 1 has the largest value (0.65), and period number 4 has the smallest value (0.04).

Note that while the examples shown here comprise an exponential formula and a lookup table, other mathematical functions that enable a front-loading effect may also be used without departing from the scope and purpose of the present invention.

Figure 6:
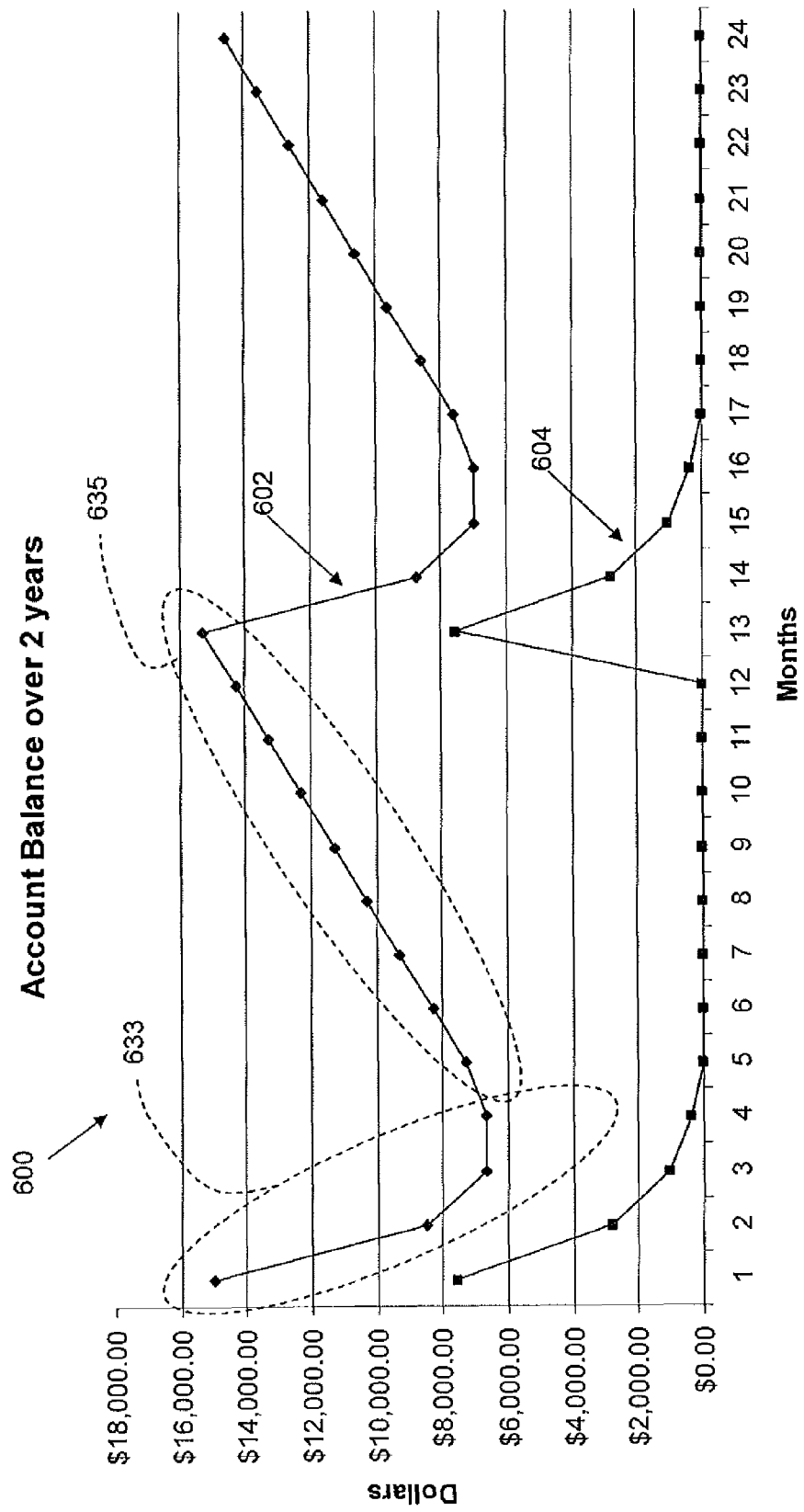
FIG. 6 is a chart showing a fund account balance and payment schedule generated by an embodiment of the present invention.

FIG. 6 is a chart 600 showing an APP fund account balance and payment schedule generated by an embodiment of the present invention. Curve 602 (top curve) represents an example of the balance in the APP fund account over a 24-month period. Curve 604 (bottom curve) represents the amount of additional principal paid over the same 24-month period.

Portion 633 of curve 602 represents a load cycle of 4 (L=4), and portion 635 of curve 602 represents a recovery cycle. During the recovery cycle, the balance in the APP fund account is replenished, and no additional principal payments are made.

Figure 7:
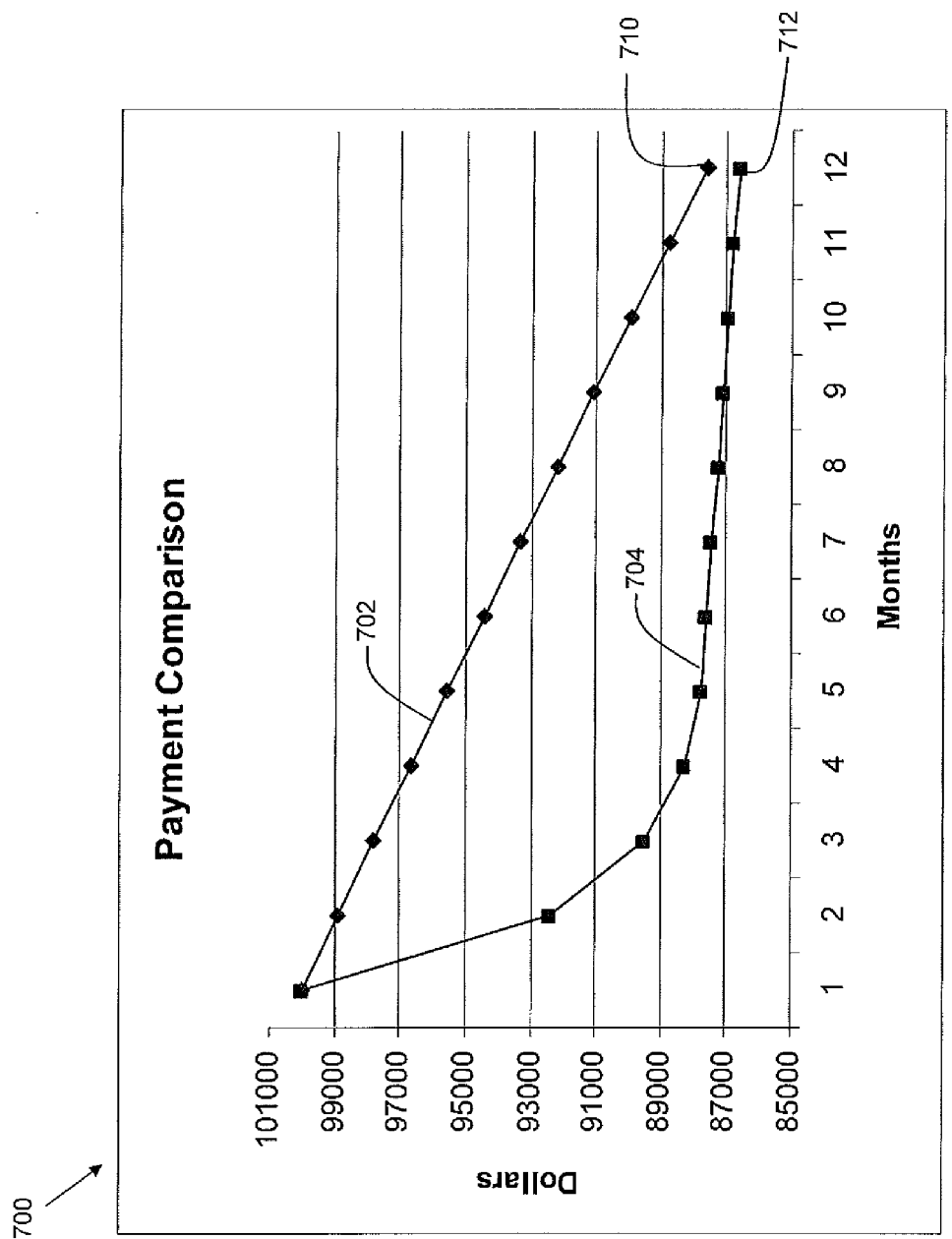
FIG. 7 is a chart showing a loan balance comparison between a periodic principal payment plan and a payment plan generated by an embodiment of the present invention.

FIG. 7 is a chart 700 showing a loan balance comparison between a periodic principal payment plan (curve 702, top curve) and a payment plan generated by an embodiment of the present invention (curve 704, bottom curve). The details of the example shown in chart 700 are as follows:

Loan amount: $100,000
Interest rate: 6%
Term: 30 years
Full cycle input amount per year: $12,000

Data point 710 represents the loan balance at the end of 12 months using equal, monthly additional principal payments, which is $87,598.

Data point 712 represents the loan balance at the end of 12 months using a payment schedule according to an embodiment of the present invention, which is $86,548. Hence, although the same amount of additional principal payments is paid during the course of a year, using an embodiment of the present invention reduced the outstanding principal of the loan by $1,050 in the first year alone, and over the life of the loan, the savings achieved with embodiments of the present invention are considerable.

Figure 8:
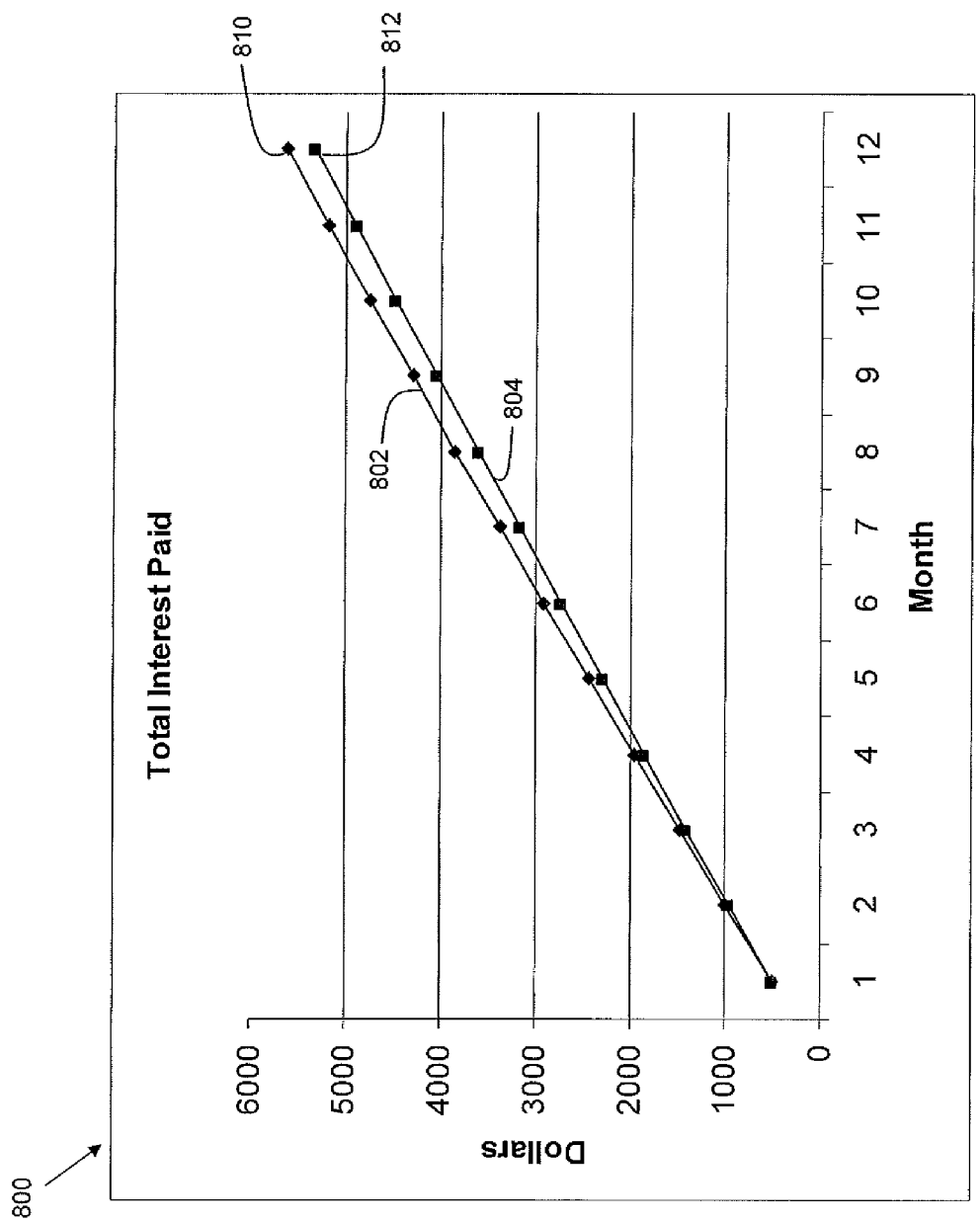
FIG. 8 is a chart showing a comparison of interest paid between a periodic principal payment plan and a payment plan generated by an embodiment of the present invention.

FIG. 8 is a chart 800 showing a comparison of interest paid between a periodic principal payment plan (curve 802, top curve) and a payment plan generated by an embodiment of the present invention (curve 804, bottom curve). Data point 810 represents the total interest paid in the first 12 months of the loan using equal, monthly additional principal payments, which is $5,631. Data point 812 represents the total interest paid in the first 12 months of the loan using a payment schedule according to an embodiment of the present invention, which is $5,229. Hence, less interest is paid using an embodiment of the present invention, even though the amount of additional principal paid over the 12-month period is the same in both cases.

It will be recognized that the invention can take the form of an entirely hardware embodiment, an entirely software embodiment, or an embodiment containing both hardware and software elements. Furthermore, in some embodiments, the invention can take the form of a computer program product accessible from a computer-usable or computer-readable medium providing program code for use by or in connection with a computing system or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device. This may include, but is not limited to, SRAM, Flash, or magnetic storage.

As can now be appreciated, embodiments of the present invention provide a new and improved way of generating a payment schedule for additional principal payments to effectively reduce the outstanding balance and the total interest paid towards a loan. Although the description above contains many specific details, these should not be construed as limiting the scope of the invention, but merely as providing illustrations of some of the presently preferred embodiments of the present invention. The present invention may have various other embodiments. Furthermore, while the form of the invention herein shown and described constitutes a preferred embodiment of the invention, it is not intended to illustrate all possible forms thereof. For example, while the illustrative examples herein used dollars, embodiments of the present invention can work with any currency. While the primary time unit of the examples was a month, other time units may be used without departing from the scope and purpose of the present invention. In addition, the fund account could also be a type of escrow account held at a lending institution. While examples shown herein have the combined duration of a load cycle and recovery cycle as one year, other durations are possible without departing from the scope and purpose of the present invention.

It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A method for generating a principal payment schedule for a loan, the method being carried out by a computer with a processor and a memory comprising:
    establishing an additional principal payment fund account;
    establishing a starting balance for the additional principal payment fund account;
    calculating a periodic deposit schedule for the additional principal payment fund account;
    establishing a full cycle input amount, corresponding to a full cycle, wherein the full cycle comprises a number of periods per full cycle;
    establishing a risk factor;
    multiplying the risk factor by the full cycle input amount to compute a full cycle reduced amount;
    dividing the full cycle input amount by the number of periods per full cycle;
    establishing a front-loaded principal payment schedule for a first predetermined period; and
    establishing a recovery cycle for a second predetermined period;
    wherein at least one of the steps is being performed by said processor.

2. The method of claim 1, wherein establishing a front-loaded principal payment schedule for a first predetermined period comprises:
    raising the full cycle reduced amount by an exponential factor, wherein the exponential factor comprises a coefficient multiplied by a period number to form a product and adding a constant to the product.

3. The method of claim 1, further comprising:
    establishing a selected maximum payment value from the additional principal payment fund account;
    retrieving a coefficient for a payment period; and
    calculating a revised additional principal payment schedule if the computed maximum payment is more than the selected maximum payment.

4. The method of claim 1, wherein establishing a front-loaded principal payment schedule for a first predetermined period comprises retrieving a coefficient for a payment period from a look-up table, wherein the coefficient value varies inversely to the payment period.

5. The method of claim 4, wherein the look-up table comprises four entries, and wherein:
    the first entry comprises a value of 0.65;
    the second entry comprises a value of 0.23;
    the third entry comprises a value of 0.08; and
    the fourth entry comprises a value of 0.04.

6. The method of claim 1, further comprising:
    establishing a selected minimum balance for the additional principal payment fund account;
    establishing a computed minimum balance for the additional principal payment fund account during a predetermined time interval; and
    calculating a revised periodic deposit schedule if the computed minimum balance is less than the selected minimum balance.

7. The method of claim 6, further comprising transferring funds from the additional principal payment fund account to a loan account based on the front-loaded principal payment schedule for a first predetermined period.

8. The method of claim 7, further comprising, suspending the transferring of funds from the additional principal payment fund account to a loan account when the balance of the additional principal payment fund account is less than the selected minimum balance.

9. The method of claim 8, further comprising, resuming the transferring of funds from the additional principal payment fund account to a loan account when the balance of the additional principal payment fund account increases to an amount greater than the selected minimum balance or the full cycle reduced amount.

10. A system for generating an additional principal payment schedule for a loan, comprising a computer, said computer comprising a processor and non-transitory storage, wherein the non-transitory storage stores machine instructions, that when executed by the processor,
    establish an additional principal payment fund account;
    accept a full cycle input amount;
    accept a risk factor, ranging in value from 0 to 1;
    multiply the risk factor by the full cycle input amount to establish a full reduced amount;
    divide the full cycle input amount by the number of periods per full cycle, thereby computing a periodic deposit schedule for said additional principal payment fund account;
    compute a front-loaded additional principal payment schedule for a first predetermined period; and
    establish a second predetermined period, wherein additional principal payments are suspended during the second predetermined period.

11. The system of claim 10, wherein the non-transitory storage further comprises machine instructions, that when executed by the processor:
    accept a selected minimum balance for the additional principal payment fund account;
    accept a computed minimum balance for the additional principal payment fund account during a predetermined time interval; and
    calculate a revised periodic deposit schedule if the computed minimum balance is less than the selected minimum balance.

12. The system of claim 10, wherein the non-transitory storage further comprises machine instructions, that when executed by the processor:
    raise the full cycle reduced amount by an exponential factor, wherein the exponential factor comprises a coefficient multiplied by a period number to form a product and adding a constant to the product.

13. The system of claim 10, wherein the non-transitory storage further comprises machine instructions, that when executed by the processor:
    retrieve a coefficient for a payment period from a look-up table, wherein the coefficient value varies inversely to the payment period.

14. The system of claim 13, wherein the lookup table comprises four entries, and wherein:
the first entry comprises a coefficient of 0.65;
the second entry comprises a coefficient of 0.23;
the third entry comprises a coefficient of 0.08; and
the fourth entry comprises a coefficient of 0.04.

15. A system for generating an additional principal payment schedule for a loan, comprising a computer, said computer comprising:
a processor; non-transitory storage; and
a communications interface connected to a communications network; wherein the non-transitory storage stores machine instructions, that when executed by the processor:
receive a risk factor, ranging in value from 0 to 1;
receive a full cycle input amount;
multiply the risk factor by the full cycle input amount to compute a full cycle reduced amount; and
raise the full cycle reduced amount by an exponential factor, wherein the exponential factor comprises a coefficient multiplied by a period number to form a product and adding a constant to the product;
compute a front-loaded additional principal payment schedule for a first predetermined period;
establish a second predetermined period, wherein additional principal payments are suspended during the second predetermined period; and
communicate with a lending system via the communications interface to schedule an additional principal payment during the first predetermined period at a time specified by the front-loaded additional principal payment schedule.

16. The system of claim 15, wherein the non-transitory storage further comprises machine instructions, that when executed by the processor:
communicate with a lending system via the communications interface to cancel an additional principal payment during the first predetermined period at a time specified by the front-loaded additional principal payment schedule if the balance in an additional principal payment fund account falls below a predetermined level.

17. The system of claim 15, wherein the non-transitory storage further comprises machine instructions, that when executed by the processor:
retrieve a coefficient for a period number from a look-up table, wherein the coefficient value varies inversely to the period number.

* * * * *